Apr. 24, 1923. 1,453,008
W. R. FOX ET AL
MULTIPLE DRILLING MACHINE
Filed Oct. 7, 1921 2 Sheets-Sheet 1
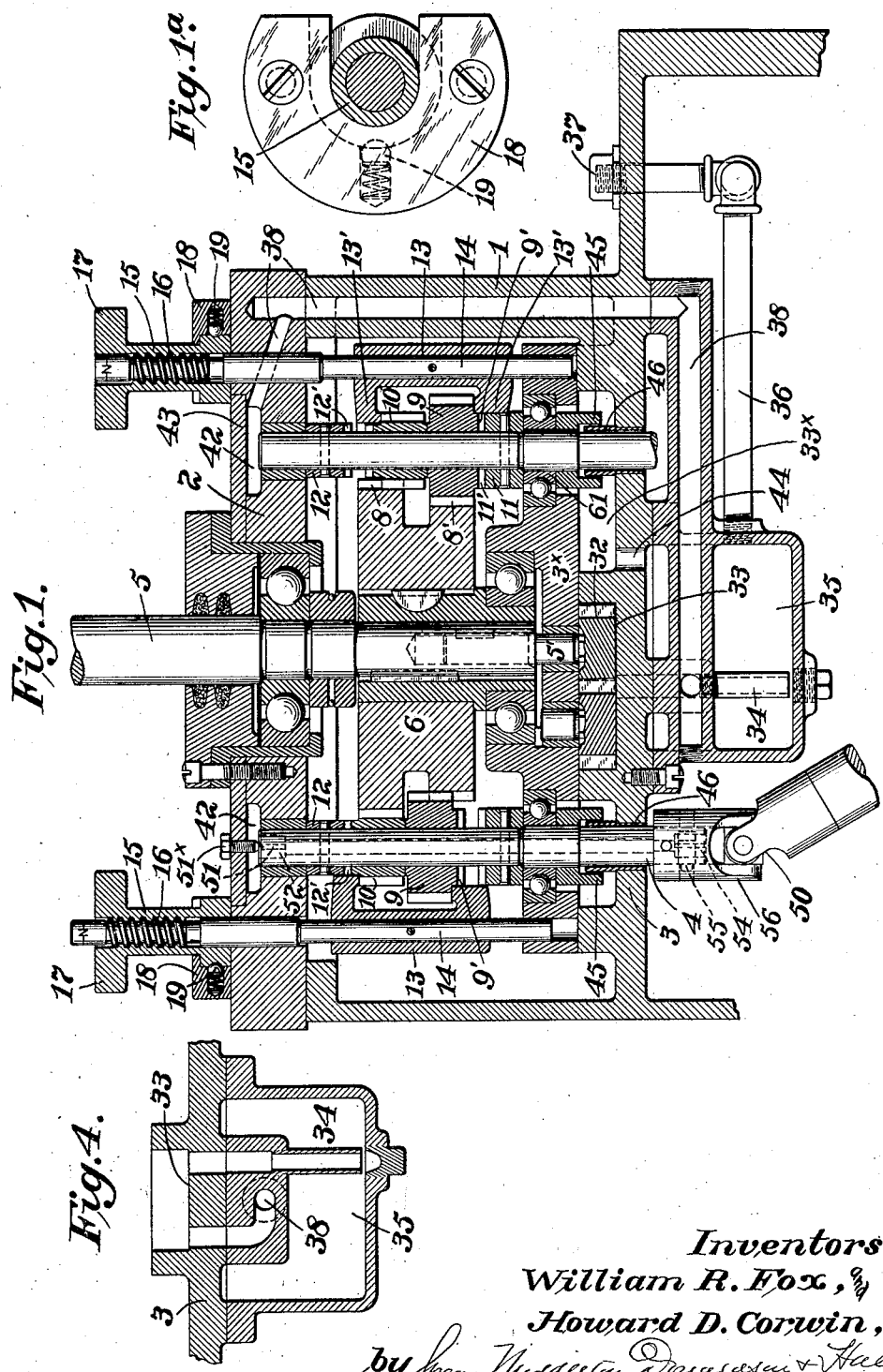
Inventors:
William R. Fox,
Howard D. Corwin,
by Spear, Middleton, Donaldson & Hall
Attys.

Apr. 24, 1923. 1,453,008
W. R. FOX ET AL
MULTIPLE DRILLING MACHINE
Filed Oct. 7, 1921 2 Sheets-Sheet 2
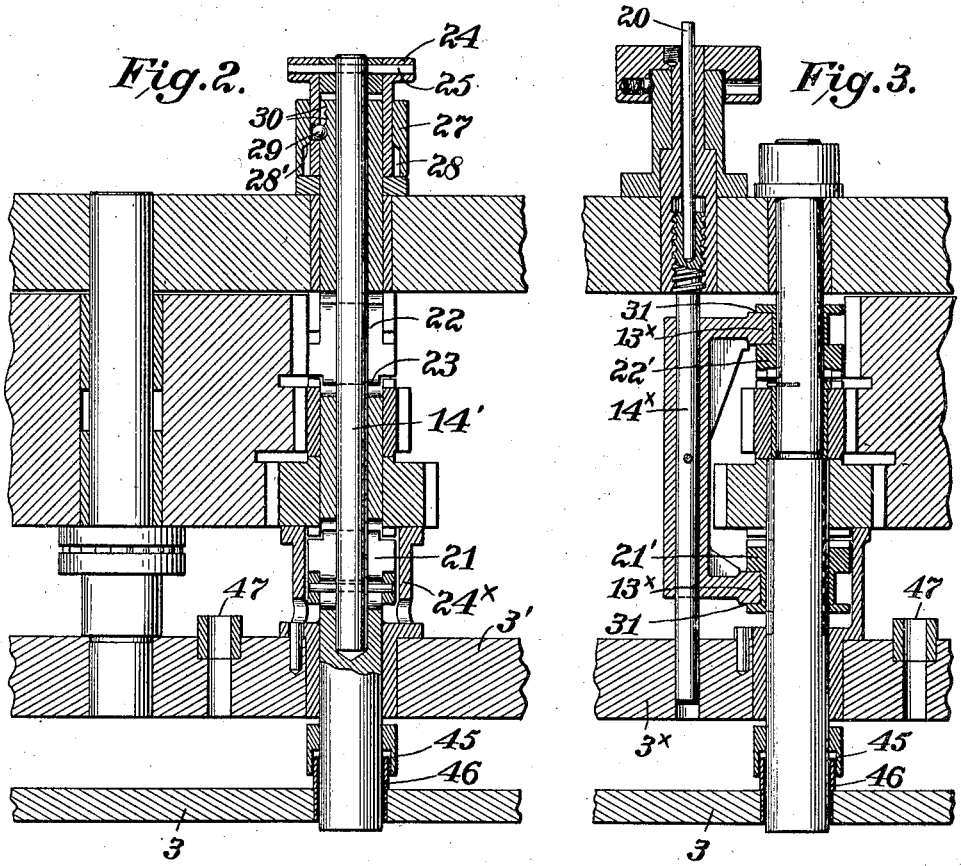
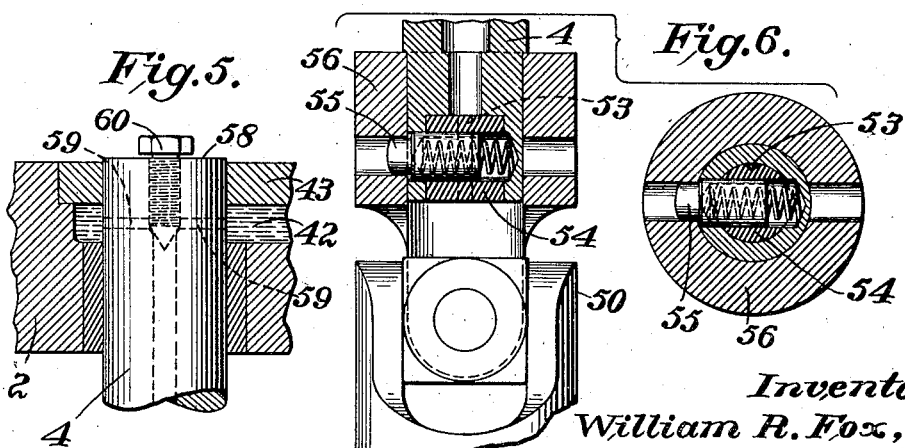
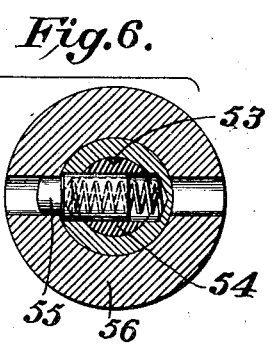
Inventors:
William R. Fox,
Howard D. Corwin,
by Spear, Middleton, Donaldson & Hall
Attys.

Patented Apr. 24, 1923.

1,453,008

UNITED STATES PATENT OFFICE.

WILLIAM R. FOX AND HOWARD D. CORWIN, OF JACKSON, MICHIGAN, ASSIGNORS TO FOX MACHINE COMPANY, OF JACKSON, MICHIGAN, A CORPORATION OF MICHIGAN.

MULTIPLE-DRILLING MACHINE.

Application filed October 7, 1921. Serial No. 506,090.

*To all whom it may concern:*

Be it known that we, WILLIAM R. Fox and HOWARD D. CORWIN, citizens of the United States, and residents of Jackson, in the county of Jackson and State of Michigan, have invented certain new and useful Improvements in Multiple-Drilling Machines, of which the following is a specification.

One object of our invention is to provide a simple and inexpensive construction of a multiple speed driving mechanism for the spindles of a drilling or tapping machine in which the mechanism will be so organized as to occupy little vertical space so that the organization may be embodied within a small compass, and further we aim to provide a positive oil circulation of the mechanism and at the same time prevent the oil from running down on the spindles below the lower bearing and to do this without increasing the inside depth of the gear chest. Other objects of the invention will be clear from the following description.

The invention is shown in the accompanying drawings in which—

Fig. 1 is a vertical sectional view through a gear chest of a multiple spindle drilling or tapping machine with our improvements embodied therein.

Fig. 1ª is a detail view.

Fig. 2 is a view of one of the spindles with the gears thereon and means for connecting these gears with the spindle, this being a modification of Fig. 1.

Fig. 3 is a view similar to Fig. 2 of another modification.

Fig. 4 is a view of part of the oil circulating system.

Fig. 5 is a view of a modified detail.
Fig. 6 shows details.

In these drawings 1 indicates a casing having a cover portion 2 secured thereto and a bottom plate 3. Within this casing gearing is located for driving the spindles which are indicated at 4. The drive takes place from a central shaft 5 through a master gear 6 having a plurality of circles of gear teeth as shown at 8, 8' of different diameters so that the spindles may be driven at variable speeds according to whether the drive takes place through the gear circle 8 or the gear 8'. As shown in Fig. 1 there are mounted on the spindles pinions 9 and 10 of different diameters. These are mounted loosely and they mesh constantly with the gears 8 and 8' respectively. For transmitting the motion from these loose pinions to the spindles, we provide clutch members comprising a collar 11 pinned to the spindle at a point below the pinion 9 and having teeth 11' to be engaged by teeth 9' of the pinion 9, and at 12 another collar is pinned to the spindle and this has teeth 12' to be engaged by teeth on the upper portion of the pinion 10. In this form of spindle pinion drive, it is necessary to hold the clutches in positive engagement, otherwise after a little wear the contacting parts would become slightly tapered or bevelled and the pressure of the driving would force them apart. It is also necessary to hold them positive in the neutral position, and to effect the positive shifting of the pinions in respect to their clutch members, we provide a fork 13 pinned to a vertically movable rod 14 so that the fork may be adjusted up and down, and in Fig. 1 it is shown in its lowermost position with the lower large diameter low speed pinion 9 in connection with its clutch member 11 so that the drive takes place through the low speed gear teeth 8 and pinion 9 to the spindle. The fork 13 is indicated in Fig. 1 as having laterally extending arms 13' between which the pinions 9 and 10 are embraced so as to be shifted slightly thereby, but it will be noticed that under all conditions the pinions maintain their meshing engagement with the gears 8, 8' and the vertical movement given to these shifting pinions is slight, being only that necessary to disengage the teeth of the pinions from the teeth of the clutch members.

For operating the rod 14 a nut 15 engages a screw thread 16 at the upper end of the said rod and this nut is adapted to be turned by a knurled finger piece or handle 17. The lower end of the nut is enlarged and turns within a plate 18 mounted on the top plate of the casing. There is a detent at 19 between the nut 15 and the post 18 so that the nut will be held under the spring pressure of this detent when it is adjusted to any one of several positions. One turn of the handle 17 will lower the rod 14 from its uppermost position (see at left of Fig. 1) so that the pinions 9 and 10 will then occupy a neutral position, both being out of engagement with their respective clutch members. One more revolution of the handle 17 will carry the rod

14 to its lower position and bring the pinion 9 into engagement with the lower clutch member for the low speed drive, the upper high speed pinion being then out of use, as shown at the right of Fig. 1. The plate 18 is fork shaped and partly embraces the part 19.

Suitable indicating means may be provided so that the operator may ascertain at a glance what the condition of the clutch mechanism is within the casing and as one form of such indicating means, we provide a rod 20, as shown in Fig. 3, connected with the upper end of the rod 14ˣ so that by observing the position of the upper end of the indicator rod 20, the operator may know whether the high speed or low speed connection is in service. This rod may be used in any of the forms of adjusting means.

It will be noticed from the organization described that the casing and the whole gear organization may occupy a minimum vertical space because only slight movement of the parts in a vertical direction is necessary in order to change from high to low speed or the reverse.

The oil circulating system includes a pump shown generally at 32 and this may be of the gear pump variety. It is located in the chamber 33 which exists between the bottom plate 3 and the partition 3ˣ, which partition affords bearings for certain of the shafting as illustrated. This pump chamber is surrounded by the cooling chamber 33ˣ. The pump is driven from the main shaft 5 by an extension 5′. This pump draws its supply through a tube 34 extending down into a chamber 35 to which is connected the filling tube 36 which has an upwardly extending portion terminating at 37 in the plane of the oil level which is to be maintained in the oil chamber 33. The pump after having drawn the oil through the pipe 34 forces the oil through the conduit 38 to the space 42 between the upper cover plate 43 and the main cover plate 2 and from this space or chamber the oil is free to flow down along the various bearings and spindles, and this oil will finally be caught in the chamber 33ˣ and from this it will pass through the port 44 back to the chamber 35 to be again elevated by the pump and distributed through the same course as just described.

The filling pipe, 36, which extends to the rear of the head, has its top at the same elevation as the bottom of collar, 45. The oil level in the chamber 33ˣ cannot rise above the bottom of the collar 45 which has a driving fit on the spindle and having a flange depending around a collar or flange 46 which is tightly fixed in the lower plate 3, and surrounds the spindle with a slight space between and extends upward within the collar 45 so that it will not be possible for any oil to run down the spindle.

The oil, in its downward passage from the chamber 42, will finally pass through the ball race outside of 61 and into the chamber 33ˣ. When the ball bearings have substituted for them the bronze bearings shown in Figures 2 and 3, the oil passage will be restricted and not as free as in Figure 1. In order to provide for the free circulation of the oil, the outlet tubes 47 are provided, the top of said tubes being above the openings in the bushing 24ˣ, which will cause some of the oil to pass between the spindle and the bushing in its downward course into the chamber below the partition 3′.

In Fig. 2, we show a modified form of connection between the high and low speed pinions, and their spindle in which instance, the pinions themselves have no vertical movement and reliance is had upon sliding keys or clutch members indicated at 21, 22. These keys are carried by a rod 14′ which may be adjusted vertically and the keys slide in keyways or slots cut through the spindle. The keys form teeth which engage similar teeth on the pinions, this construction being shown generally at 23 and needing no particular description. The lower pinion is supported upon the extension of bushing 24ˣ and this also forms the lower bearing to the spindle, which bushing in turn is supported by the lower partition 3′ of the main casing. In this instance, vertical movement of the rod 14′ will disengage one of the keys from its pinion and engage the other key with its pinion so that the speed may be changed from high to low, or the reverse according to the vertical adjustment of the rod 14′. This rod at its upper end has pinned thereto a spool 24, the connection pin 25 moving the rod 14′ up and down within the pinion shaft. A collar 27 surrounds the spool or handle member 24 and this collar is recessed at 28 at its lower portion to cooperate with a detent 29 consisting of a ball carried by the cylindrical part of the member 24 and adapted to occupy one of a number of seats 30 in the side of the shaft or spindle. When the collar 27 is raised the detent or ball 29 can recede from its seat in the spindle and then the handle 24 with the rod 14′ may be adjusted either up or down so as to get the desired gear connection for high or low speed, and after this adjustment has been effected, the collar 27 is lowered and this causes the ball detent to be seated in the recess of the spindle, and therefore rod 14′ will be held in its adjusted position. The collar 27 is formed with cam incline 28′ to work upon the ball detent so as to force it into locking position.

In the construction just described, it will be observed that the pinions have no vertical movement and the height of the casing and the whole organization is kept down to a minimum because it requires only a slight vertical movement of the keys in order to disengage or engage their respective pinions.

In Fig. 3 another modification is shown in which the keys instead of being operated by a rod 14 extending centrally through the spindle and instead of slotting the spindle to receive the keys, these keys are arranged externally to the spindles as shown at 21′, 22′, and are connected to the spindles by a spline. These keys or clutch members have circumferential grooves at 31 to receive the fork arms 13ˣ, said arms being carried by the rod 14ˣ which is adjustable vertically and in the present instance we show adjusting means similar to that shown in Fig. 1.

*Universal joints.*—These are shown generally at 50. They are oiled from chamber 42 through a port 51 in a block 52 inserted in the spindle. This port delivers oil through the interior of the spindle and through a side port 53 of a plug 54 which is inserted in the lower end of the spindle, where this spindle is attached by the spring plunger 55 to the fork 56 of the universal joint. This plug is inserted before the end of the spindle is bored out laterally, to receive the spring plunger 55 so that the bored recess is partly in the end of the spindle and partly in the plug.

The oil which passes through the side port 53 drops onto the block of the coupling of the universal joint and keeps the parts lubricated.

The amount of oil passing to the coupling may be regulated by a screw 51ˣ. Instead of this adjustment the spindle can be carried up through the top cover plate as shown at 58 and holes 59 may lead the oil from chamber 42 into the interior of the spindle under control of the needle valve 60 revolving with the spindle, as shown in the modification, Fig. 5.

The upper end of the filling tube 37 is on a level with the lower edge of the collar 45 so that in supplying oil to the apparatus it can not be filled to a level higher than the lower edge of the collar 45.

It has been difficult to provide sufficient lubrication to the gears and the bearings and at the same time prevent the lubricant from running down between the spindle and the bearing and under the universal joint and spindles, and to be thrown over the work and workers. This is positively overcome by the tight bushing 46, passing up into the collar 45 which is pressed onto the spindle and projects over and below the top of 46.

It will be seen that in all cases the pinions and the clutch means are relatively movable. In one instance the pinions are shiftable, and in other forms the pinions remain at one level and the clutch means are moved, and in all cases also the pinions maintain their engagement with the driving gears.

In Fig. 1 the high speed pinion at the left is the one which is connected to its spindle through the clutch and this is in full engagement with its driving gear. The low speed pinion is also in engagement with its driving gear throughout a large portion of its tooth length. When the shift takes place for the low speed drive this low speed pinion will be in full engagement and the high speed pinion whilst shifted downwardly will maintain engagement for a large portion of its tooth length, as shown on the right of Fig. 1.

We claim:

1. In combination in a multiple drill press, spindles, one for each drill having means to connect, individually, each with its own drill driving gears, for high and low speed, high and low pinions on the spindles, clutch means, one for each drill spindle between the respective pinions and the spindle mounted in part on the spindle and in part on the pinion, said pinions and clutch means being relatively movable, to change the speed of the spindles individually while the pinions are maintained in mesh with their respective driving gears, substantially as described.

2. In combination in a multiple drill press, spindles, driving gears, for high and low speed, high and low speed pinions on the spindles, clutch means in fixed relation to the spindles, said pinions being loose on the spindles and shiftable into and out of connection with the clutch means while maintaining their intermeshing engagement with the driving gears, substantially as described.

3. In combination in a multiple drill press, spindles, high and low speed gearing, high and low speed pinions on the spindles, clutch means in fixed relation to the spindles, and adapted to engage clutch means on the pinions, a fork for each pair of high and low speed pinions embracing the same and means for shifting the fork to move the pinions into and out of connection with the clutch means while maintaining their intermeshing engagement with the driving gears, substantially as described.

4. In combination in a multiple drill press, spindles, high and low speed gearing, high and low speed pinions on the spindles, clutch means in fixed relation to the spindles, and adapted to engage clutch means on the pinions, a fork for each pair of high and low speed pinions embracing the same and means for shifting the fork to move the pinions into and out of connection with the clutch means while miantaining their intermeshing engagement with the driving gears, and means for holding said adjusting fork for positively holding either pinion in engagement with its clutch and also in the neutral position, substantially as described.

5. In combination in a multiple drill press, master gear means having rows of teeth of different diameters, a plurality of drill spindles disposed at different points about the master gear means, a high and low speed pinion on each spindle, a pair of clutches for each spindle comprising members carried by the pinions and members carried by the spindles, and means for giving a relative movement to the clutch members of the spindles and pinions, and for positively holding clutch members either in or out of engagement, the said pinions always maintaining their engagement with the master gear means, substantially as described.

6. In combination in a multiple drilling machine, a casing, spindles, a pair of pinions on each spindle, gears for driving the pinions, and means for shifting the pinions including a screw threaded rod extending parallel with the spindle and to a point above the casing, a nut engaging the screw rod and carried by the top of the casing, a member mounted on the top of the casing, a rotary handle connected with the nut for moving the screw and detent means between the rotary handle and the said member, substantially as described.

7. In combination in a multiple drilling machine spindles, a pair of pinions on each spindle, gears for driving the pinions, means for shifting the pinions and holding them in positive engagement and also in neutral position, including a screw threaded rod extending parallel with the spindle and to a point above the casing, a nut mounted on casing's top of the top plate, and a plate partially enclosing the nut to hold it against upward movement, said plate being secured for the top plate and carrying a detent.

8. In combination, in a multiple drilling machine spindles, a pair of pinions on each spindle, gears for driving the pinions, means for throwing the pinions into and out of action including a screw and nut and a fork operated thereby, one revolution in either direction of the nut moving the fork from neutral to positive engagement in either direction, and detent means for holding the fork in either position for driving through either the one pinion or the other, or for holding the fork in neutral position, said screw extending to a point above the casing and said nut being supported on the top of the casing.

9. In combination in a multiple spindle drilling machine, spindles, gearing for driving same, a gear chest having upper and lower partitions serving for spindle bearings and also providing oil chambers one above the upper partition and one below the lower partition, means for delivering the oil from the lower chamber to the upper chamber and means for preventing the oil from passing from the lower chamber to that part of the spindle passing below the lower partition the said upper and lower oil chambers being common to a plurality of spindles, substantially as described.

10. In combination in a multiple spindle drilling machine, spindles, gearing for driving same, means for flushing the bearings with grease or oil and means for preventing the oil from passing below the bottom of the gear chest, said means consisting of a bushing tight in the bottom of the gear chest and extending upward above the oil level in said gear chest, the spindles having a collar or projection secured oil tight on the spindle of a larger diameter than the bushing in the head, said collar being recessed and extending down and over the bushing a sufficient distance to keep the oil from passing over the top of the bushing, substantially as described.

11. In combination in a multiple spindle drilling machine, spindles, gearing for driving the same, a gear chest having upper and lower partitions with an oil chamber above the upper partition and an oil chamber below the lower partition, said partitions having bearings for the gear shafts and spindles and with all the spindles at their upper ends exposed to the oil in the upper chamber, and at their lower ends extending across the lower chamber, a pump, and means for delivering the oil therefrom to the upper oil chamber from whence the oil passes through the bearings and reaches the lower chamber, and a chamber below the lower chamber from which the pump gets its supply, said chamber being connected with the lower oil chamber, substantially as described.

12. In combination in a multiple spindle drilling machine, spindles, gearing for driving the same, a gear chest having upper and lower partitions with an oil chamber above the upper partition and an oil chamber below the lower partition, said partitions having bearings for the gear shafts and spindles, a pump in the lower chamber, and means for delivering the oil therefrom to the upper oil chamber from whence the oil passes through the bearings and reaches the lower chamber, a main drive shaft extending into the casing for driving the gearing, said pump being operated by an extension of said shaft, substantially as described.

13. In combination a casing having a bottom and a recessed top, with a partition at the lower part forming an oil chamber between itself and the bottom of the casing a supplemental cover extending over a recess in the top, spindles having bearings exposed at said recess which is common to them all and having bearings in the partition and means for delivering oil to the said recess to run through the bearings to reach the lower chamber and for returning the oil to the upper recess, substantially as described.

14. In combination a casing for a multiple spindle drill head having a top, a bottom and a partition above the bottom forming an oil chamber, gearing, shafts therefor having bearings in the top of the casing and in the partitions, spindles bearing in the top and extending through bearings in the partition and extending also through the bottom, means for distributing oil to the upper bearings, from whence the oil runs down and reaches the oil chamber below the partition, collars on the spindles having depending flanges, and flanges extending up within the flanges of the collars, and fixed in the bottom plate to surround the spindles, said upwardly extending flanges being slightly spaced apart from the spindles and from the flanges of the collars whereby the lower oil chamber is in communication with the outside of the casing and a filling tube having its upper end on the level of the lower edge of the collar flange to prevent filling the chamber above the level of said edge, substantially as described.

15. In combination a casing, having a top and bottom and a partition forming an oil chamber between itself and the bottom, gearing and spindles having bearings in the top of the casing and in the partition, said spindle extending down through the oil chamber and the bottom, means for distributing oil to the upper bearings to run down therethrough into the casing, said partition having openings for the passage of oil to the lower chamber, substantially as described.

16. In combination of a casing, gearing and spindles having bearings in the top of the casing and in the bottom of the casing, means for distributing oil to the upper bearings to run down through into the casing and means to prevent the oil from following the spindle below the bottom of the casing, said means consisting of a collar fixed to the spindle and overhanging an annular flange extending up from the bottom, substantially as described.

17. In combination a casing having a top and bottom and a partition forming an oil chamber between itself and the bottom, gearing and spindles having bearings in the top of the casing and in the partition, said spindles extending across the oil chamber, means for distributing oil to the upper bearings to run down therethrough into the casing, said partition having openings for the passage of oil to the lower chamber, said openings being guarded by flanges extending up from the partition, substantially as described.

18. In combination in a multiple drill press, spindles, driving gearing for high and low speed, high and low speed pinions on the spindles, clutch means between the pinions and the spindles, said pinions and clutch means being relatively movable into and out of engagement with each other and means for positively holding them in engagement or out of engagement said pinions maintaining engagement at all times with the driving gearing, substantially as described.

19. In combination, in a multiple drill press, spindles gearing for driving the same, a gear chest, universal joints at the lower ends of the spindles, an oil circulating system for taking the oil from the lower part of the chest and delivering it to the upper part and means for feeding oil through the spindles to the universal joints.

20. In combination, in a multiple drill press, spindles, driving gears, for high and low speed, high and low speed pinions on the spindles, clutch means between the spindles and the pinions, said clutch means and pinions being relatively shiftable to change the speed while the pinions maintain their engagement with the driving gears, rods extending lengthwise of the pinion shafts, connections between said rods and the shiftable parts and means for shifting and positively holding said rods in their different positions.

21. In combination, in a multiple drill press, spindles, driving gears, for high and low speed, high and low speed pinions on the spindles, clutch means between the spindles and the pinions, said clutch means and pinions being relatively shiftable to change the speed while the pinions maintain their engagement with the driving gears, rods extending lengthwise the pinion shafts, connections between said rods and the shiftable parts and means for shifting and positively holding said rods in their different positions, said means consisting of a nut on each rod engaging a screw thread thereon and detent means for holding the nut, substantially as described.

22. In combination, in a multiple drill press, spindles, one for each drill driving gears, high and low speed pinions mounted on the spindles and adjoining each other, clutch means also mounted on the spindles above and below the pinions, said clutch means and pinions being relatively shiftable, forks engaging the shiftable parts, rods for operating the forks extending lengthwise of the spindles and means for operating the rods substantially as described.

23. In combination in a multiple drill press, master gear means having rows of teeth of different diameter, a plurality of drill spindles extending parallel with the axis of the master gear and at different points about the same, a high and low speed pinion on each spindle, each spindle carrying a pair of clutch members, one for the high speed pinion and one for the low speed pinion, complementary clutch members on the pinions, and means for giving a relative movement to the clutch members of the spindles and pinions to change the speed while the pinions remain in mesh with the rows of teeth of the master gear, substantially as described.

24. In combination, in a multiple drilling machine, a gear chest having a pair of horizontally extending members at the top and bottom thereof forming respectively an upper and a lower oil chamber, master gear means disposed centrally of the chest, drill spindles arranged parallel with the axis of the master gear means and at different points about the same, said spindles having bearing in the horizontally extending members, and all of said spindles being exposed to the oil in said oil chambers, which are common thereto, pinions for driving the spindles from the master gear means, arranged in the space of the chest between the upper and lower pairs of horizontally extending members, and means for pumping the oil from the lower oil chamber to the upper oil chamber, substantially as described.

25. In combination in a drilling machine, a drill spindle, gearing for driving the same, means for supplying the gearing and spindle bearings with oil, and means for controlling the course of the oil, including a lower member forming a part of an inclosure for the spindle, a collar fixed oil tight in the said lower member and through which collar the spindle extends downwardly, said collar reaching up into the oil space from said lower member, and a collar fixed oil tight on the spindle, and having a flange reaching below the upper edge of the first mentioned collar, substantially as described.

26. In combination in a multiple spindle drilling machine, a casing, vertical spindles thereon, gearing for driving the same including a pair of pinions on each spindle, gears for driving said pinions, and means for changing the drive to be imparted through either one pinion or the other of each pair consisting of a connection extending vertically of the casing in which said spindles, gears and pinions are located, and means at the upper end of said connections above the casing for moving the said connection vertically, substantially as described.

In testimony whereof, we affix our signatures.

WILLIAM R. FOX.
HOWARD D. CORWIN.